Figure 1:
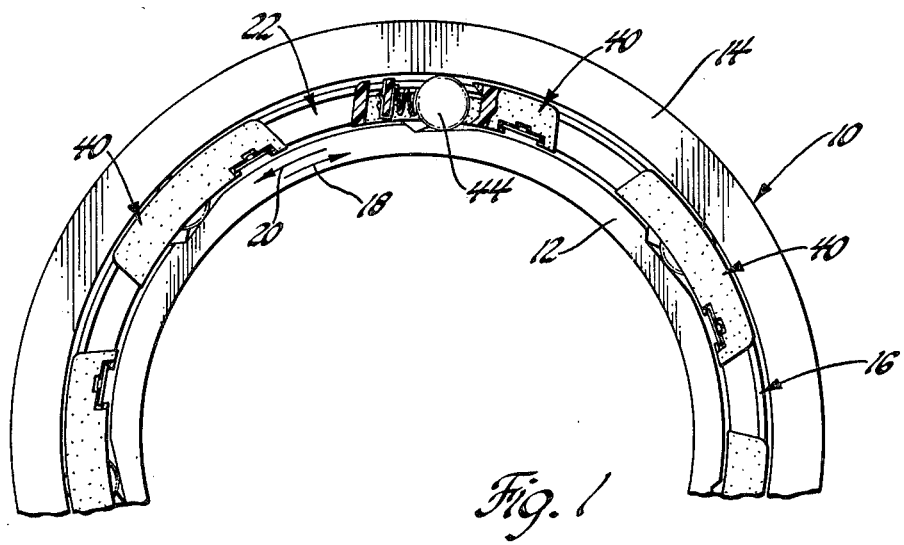

United States Patent [19]

Kitchin

[11] 4,185,724
[45] Jan. 29, 1980

[54] PREASSEMBLED UNIT AND ROLLER CLUTCH SUBASSEMBLY HAVING SAME

[75] Inventor: Oscar G. Kitchin, Port Clinton, Ohio

[73] Assignee: General Motors Corporation, Detroit, Mich.

[21] Appl. No.: 929,309

[22] Filed: Jul. 31, 1978

[51] Int. Cl.[2] .................. F16D 3/34; F16D 63/00; F16D 41/06

[52] U.S. Cl. .................................................. 192/45

[58] Field of Search .................. 192/45; 308/217; 188/82.84, 82

[56] References Cited

U.S. PATENT DOCUMENTS

| 3,547,238 | 12/1970 | Harmon | 192/45 |
|---|---|---|---|
| 3,732,956 | 5/1973 | Johnson et al. | 192/45 |
| 3,902,580 | 9/1975 | Johnson | 192/45 |
| 3,917,036 | 11/1975 | Johnson et al. | 192/45 |
| 3,927,744 | 12/1975 | Hallerberg | 192/45 |
| 4,054,192 | 10/1977 | Johnson | 192/45 |
| 4,088,211 | 5/1978 | Doller et al. | 192/45 |
| 4,106,602 | 8/1978 | Dieckermann | 192/45 |

*Primary Examiner*—Ronald Feldbaum
*Attorney, Agent, or Firm*—F. J. Fodale

[57] ABSTRACT

An overrunning roller clutch is provided with a stamped and bent sheet metal cage which carries a number of preassembled units. Each unit comprises a bearing block, a roller translatably disposed in a pocket of the bearing block and a tickler spring biasing the roller in a retained position in the pocket.

4 Claims, 5 Drawing Figures

U.S. Patent

Jan. 29, 1980

4,185,724

PREASSEMBLED UNIT AND ROLLER CLUTCH SUBASSEMBLY HAVING SAME

This invention relates generally to overrunning roller clutches and more particularly to a unit handled roller clutch subassembly of the type which includes a cage and bearing blocks such as is disclosed in the U.S. patent application Ser. No. 783,420 filed Mar. 31, 1977 now U.S. Pat. No. 4,088,211 by John S. Doller and Oscar G. Kitchin for an "Overrunning Roller Clutch with Improved Cage and Bearing Block".

The unit handled roller clutch subassembly disclosed in the aforementioned patent application while suitable for many purposes requires complicated assembly procedures and equipment since the bearing blocks and tickler springs are assembled to the cage in different directions on separate cantilevered cage tabs.

It is broadly the object of this invention to generally improve upon the unit handled roller clutch subassembly disclosed in the aforementioned patent application particularly with regard to simplifying assembly procedures and equipment.

Another object of this invention is to provide an improved roller clutch subassembly in which the bearing blocks, rollers and tickler springs are formed in preassembled units.

Another object of this invention is to provide an improved roller clutch subassembly having bearing blocks with tickler springs mounted thereon in preassembled units thereby eliminating the need for separate spring mounting tabs on the cage.

Still another object of this invention is to provide a preassembled unit comprising a bearing block carrying a translatable spring biased roller which is adapted for mounting on a cantilevered tab to form a unit handled roller clutch subassembly in conjunction with a cage and other like preassembled units.

Figure 2:
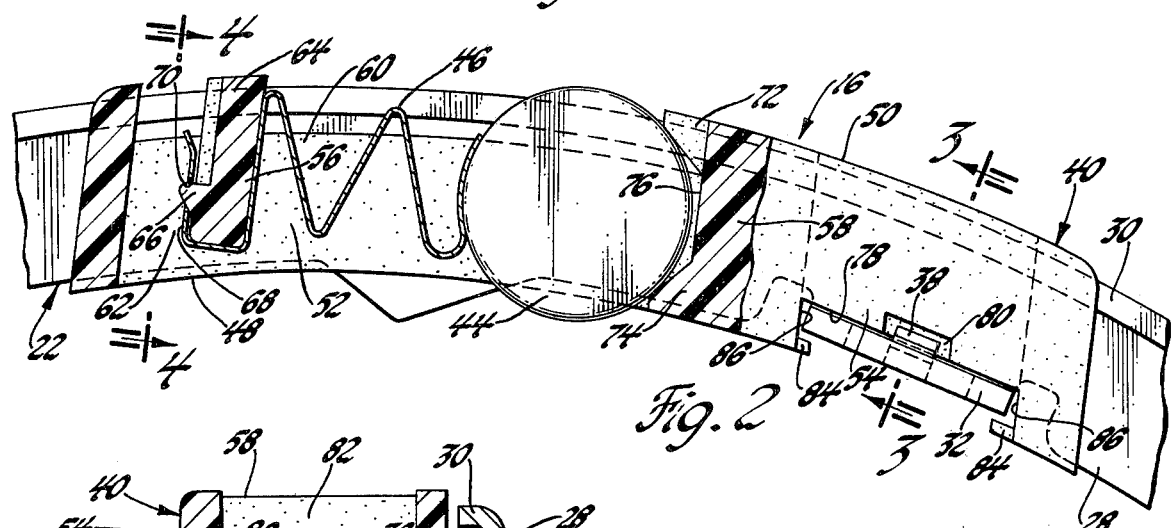
Figure 3:
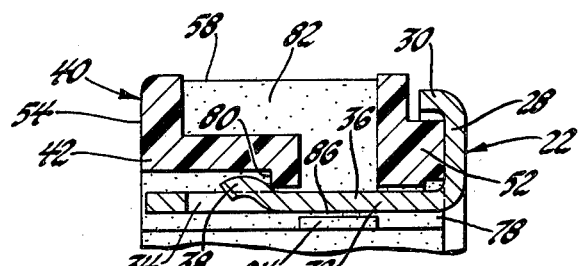
Figure 4:
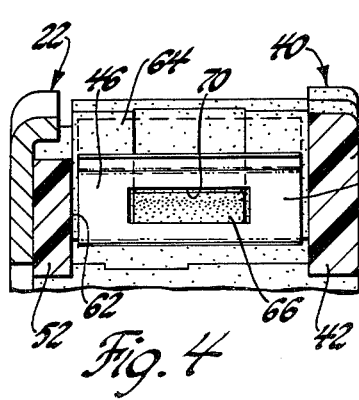
Figure 5:
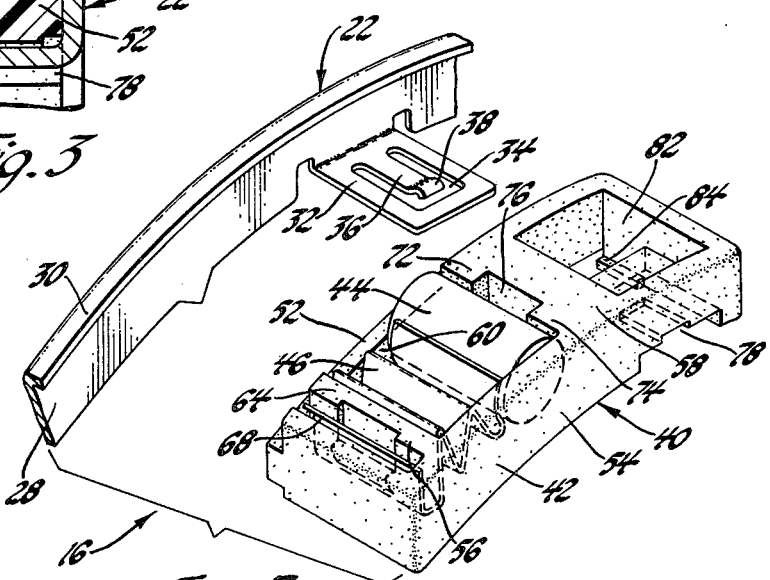

Other objects and features of the invention will become apparent to those skilled in the art as the disclosure is made in the following detailed description of a preferred embodiment of the invention as illustrated in the accompanying sheet of drawing in which:

FIG. 1 is a fragmentary front view of an overrunning roller clutch having a unit handled roller clutch subassembly and preassembled units in accordance with this invention, FIG. 2 is an enlarged partially sectioned view of a portion of the subassembly and a preassembled unit shown in FIG. 1, FIG. 3 is a section taken substantially along the line 3—3 of FIG. 2, FIG. 4 is a section taken substantially along the line 4—4 of FIG. 2, and FIG. 5 is an exploded perspective view of the enlarged portion shown in FIG. 2.

Referring now to the drawing and more particularly to FIG. 1, this invention is concerned with an overrunning roller clutch indicated generally at 10 comprising an inner race 12 and an outer race 14 having a unit handled caged roller subassembly indicated generally at 16 therebetween. The caged roller subassembly 16 cooperates with the races 12 and 14 to permit the races to rotate relative to one another in one direction while locking the races together in response to relative rotation in the opposite direction. For instance, in the clutch 10 illustrated in FIG. 1, the inner race 12 is freely rotatable in the clockwise direction relative to the race 14 as indicated by the arrow 18. On the other hand, relative rotation in the opposite direction indicated by the arrow 20 is prevented by the rollers locking the races together.

The subassembly 16 includes a one-piece cage 22 generally annular in form and fabricated from sheet metal by stamping and bending operations. The cage 22 comprises a single end ring portion 28 having an outer stabilizing flange 30 and a plurality of circumferentially spaced cantilevered tab portions 32. The tab portions 32 are integrally connected to the inner margin of the end ring portion 28 by perpendicular bends so as to extend in cantilevered fashion therefrom in the same axial direction as the stabilizing flange 30.

Each of the tab portions 32 (as best illustrated in FIGS. 2, 3 and 5) have a central U-shaped slot 34 which defines a cantilevered retention finger 36 having its free end remote from the end ring portion 28. The free end of the finger 36 is bent to provide a curved latch 38 of part cylindrical shape.

The subassembly 16 also includes a number of preassembled units 40 each comprising a molded plastic bearing block 42 which carries a translatable roller 44 biased by a tickler spring 46. The bearing block 42 is of a low friction material such a nylon and has inner and outer concentric bearing surfaces 48 and 50 for centering the outer race 14 on the inner race 12.

The bearing block 42 has side rail portions 52 and 54 connected by cross bar portions 56 and 58 which define a rectangular roller pocket 60 which receives a roller 44 therein for translation in the circumferential direction. The side rail portion 52 (as best seen in FIG. 3) is reduced in radial height to accommodate the stabilizing flange 30 of the cage 22.

The cross bar portion 56 has a radial slot 62 which provides a protected mounting wall 64 at one end of the roller pocket 60. The bottom or radially inner end of the mounting wall 64 is spaced from the bottoms of the side rail portions 52 and 54 adapting the wall to receive and retain the U-shaped clip end 68 of the tickler spring 46 in a noninterfering position. A projecting locking nib 66 on the mounting wall 64 enters a square aperture 70 in the clip end 68 to secure the same.

The cross bar portion 58 has radially spaced ledges 72 and 74 at the opposite side of the pocket 60 which provide roller retention. The radially outer ledge 72 consists of two axially spaced portions separated by a central slot 76 aligned with the radially inner ledge 74 which consists of a single central portion. This arrangement facilitates molding the ledges in a two part mold.

The cross bar portion 58 has a circumferential slot 78 which extends through the bearing block 42 in the axial direction. The circumferential slot 78 intersects the inner bearing surface 48 and has a narrow central enlargement which extends partway back from the front side rail 54 to provide a retention shoulder 80. The cross bar portion 58 also has an upper cavity 82 which communicates with the circumferential slot 78 at its rearward portion adjacent the side rail 52. The circumferential slot 78 is partially defined by short lower ledges 84 aligned with the communicating rearward portion of the upper cavity 82. This arrangement facilitates molding in a two part mold and provides narrow side slot portions 86 for the edges of the tab portion 32 of the cage 22 as best seen in FIG. 3.

The bearing blocks 42, rollers 44 and springs 46 are formed into preassembled units 40 simply by mounting the clip ends 68 on the mounting walls 64 from the radially inward or lower direction. The rollers 44 may then be popped into a retained position in the pockets 60 from the radial direction. It is also possible to assemble the springs and rollers from the same radial direction at the same time.

In any event, the units 40 are easily formed with an assembly line technique using relatively uncomplicated equipment which feeds rollers and springs transversely to the direction of the assembly line movement.

The roller clutch subassembly 40 is then formed simply by sliding the preassembled units axially onto the tabs 32. This can be done with a linear feed of the units and a transverse assembly motion. The units could be assembled one at a time with indexing of the cage or fed into an indexing holder and assembled simultaneously to the cage. In either event, the assembly equipment is relatively uncomplicated.

I wish it to be understood that I do not desire to be limited to the exact details of construction shown and described, for obvious modifications will occur to a person skilled in the art.

What is claimed is:

1. In a unit handled roller clutch subassembly having a sheet metal cage with a single end ring portion and a plurality of circumferentially spaced, integral tab portions extending in cantilevered fashion therefrom in an axial direction, a plurality of bearing blocks of low friction material having inner and outer bearing surfaces mounted on respective tab portions for centering inner and outer clutch races with respect to each other, a slot in each bearing block receiving an associated tab portion for securing the bearing block to the cage, the improvement comprising:

each of said bearing blocks having a rectangular pocket and forming a preassembled unit together with a roller translatable in a circumferential direction in the rectangular pocket and a spring mounted at one end of the rectangular pocket engaging the roller and biasing it in a retained position in the rectangular pocket.

2. In a unit handled roller clutch subassembly having a sheet metal cage with a single end ring portion and a plurality of circumferentially spaced, integral tab portions extending in cantilevered fashion therefrom in an axial direction, a plurality of bearing blocks of low friction material having inner and outer bearing surfaces mounted on respective tab portions for centering inner and outer clutch races with respect to each other, a slot in each bearing block receiving an associated tab portion for securing the bearing block to the cage, the improvement comprising:

each of said bearing blocks having a rectangular pocket and a radial slot therethrough forming a mounting wall at one end of the pocket and each of said bearing blocks forming a preassembled unit together with a roller translatable in a circumferential direction in the pocket therein, and a spring secured to the mounting wall which engages the roller and biases it against a retention surface at an end of the pocket opposite the mounting wall.

3. In a unit handled roller clutch subassembly having a sheet metal cage with a single end ring portion and a plurality of circumferentially spaced, integral tab portions extending in cantilevered fashion therefrom in an axial direction, a plurality of bearing blocks of low friction material having inner and outer bearing surfaces mounted on respective tab portions for centering inner and outer clutch races with respect to each other, a slot in each bearing block receiving an associated tab portion for securing the bearing block to the cage, the improvement comprising:

each of said bearing blocks having a rectangular pocket spaced from its slot in the circumferential direction and forming a preassembled unit together with a roller translatable in a circumferential direction in the pocket, and a spring mounted at an end of the rectangular pocket remote from the slot which engages the roller and biases it against a retention surface at an end of the pocket adjcent the slot, said cage having a preassembled unit secured to each of its tab portions and a stabilizing flange confronting side rail portions of the bearing blocks.

4. A preassembled unit for a unit handled roller clutch subassembly comprising:

a bearing block having a rectangular pocket and a radial slot therethrough forming a mounting wall at one end of the pocket, a roller translatably disposed in the pocket for movement in a circumferential direction therein, and a spring secured to the mounting wall which engages the roller and biases it against a retention surface at an end of the pocket opposite the mounting wall, said bearing block having slot means spaced from the retention surface in a direction away from the pocket for securing the preassembled unit to a cage.

* * * * *